United States Patent

[11] 3,602,545

| [72] | Inventor | Leo K. Lindenbauer |
| | | 81 North Valentine, Wickenburg, Ariz. 85358 |
| [21] | Appl. No. | 865,859 |
| [22] | Filed | Oct. 13, 1969 |
| [45] | Patented | Aug. 31, 1971 |

[54] FOLDING CONNECTION ROOM FOR TRAILERS
2 Claims, 4 Drawing Figs.

[52] U.S. Cl. ..................................... 296/23, 105/8
[51] Int. Cl. ..................................... B60p 3/32
[50] Field of Search ......................... 296/23, 26; 105/8, 8 R, 22

[56] References Cited
UNITED STATES PATENTS
2,793,597   5/1957   Walters ..................... 105/8 R
FOREIGN PATENTS
376,998   7/1932   Great Britain ................ 296/23.7

*Primary Examiner*—Philip Goodman
*Attorney*—Willard L. Groene

ABSTRACT: A folding connecting room which combines two trailer units of inadequate size, to create a multiroom mobile housekeeping suite and which is supported on the hitch of one of the trailer units and occupies the hitch space between the trailer units.

PATENTED AUG 31 1971     3,602,545

INVENTOR.
LEO K. LINDENBAUER
BY
Willard S. Grover
ATTORNEY

FOLDING CONNECTION ROOM FOR TRAILERS

BACKGROUND OF THE INVENTION

This invention pertains to housekeeping trailers and is particularly directed to folding auxiliary rooms for such trailers.

Heretofore, when trailers are hitched to campers or other trailers, a space exists between the units and this space was not usable as further living quarters for the trailer units or as an interconnecting room or covered passageway between the units. It was thus necessary to waste this space and it was necessary to go out in bad weather to go between the trailer units.

SUMMARY OF THE INVENTION

One of the objects of this invention is to provide a folding connecting room for trailers so that when it is unfolded over the trailer hitch between the two trailer units it combines these units and creates a mobile housekeeping apartment, with facilities that would otherwise be possible only by pulling a large cumbersome multiroom mobile home.

Another object is that when it is being used between two trailer units is to have a multiroom mobile apartment that may be readily divided into two camping units.

Still another object is to provide a simple, rugged compartment between trailer units that is easily folded up out of the way, but is sufficiently self-supporting, when unfolded, to eliminate the necessity of building connecting framework for attachment to the forward trailer unit.

A further object is to allow more flexibility of movement for the two trailer units, when one is pulling the other, by folding it up against the front of the rear trailer unit where it is out of the way.

Another object is to provide a porch for the rear trailer unit when it is used separately.

DESCRIPTION OF THE PREFERRED EMBODIMENT

Figure 1:
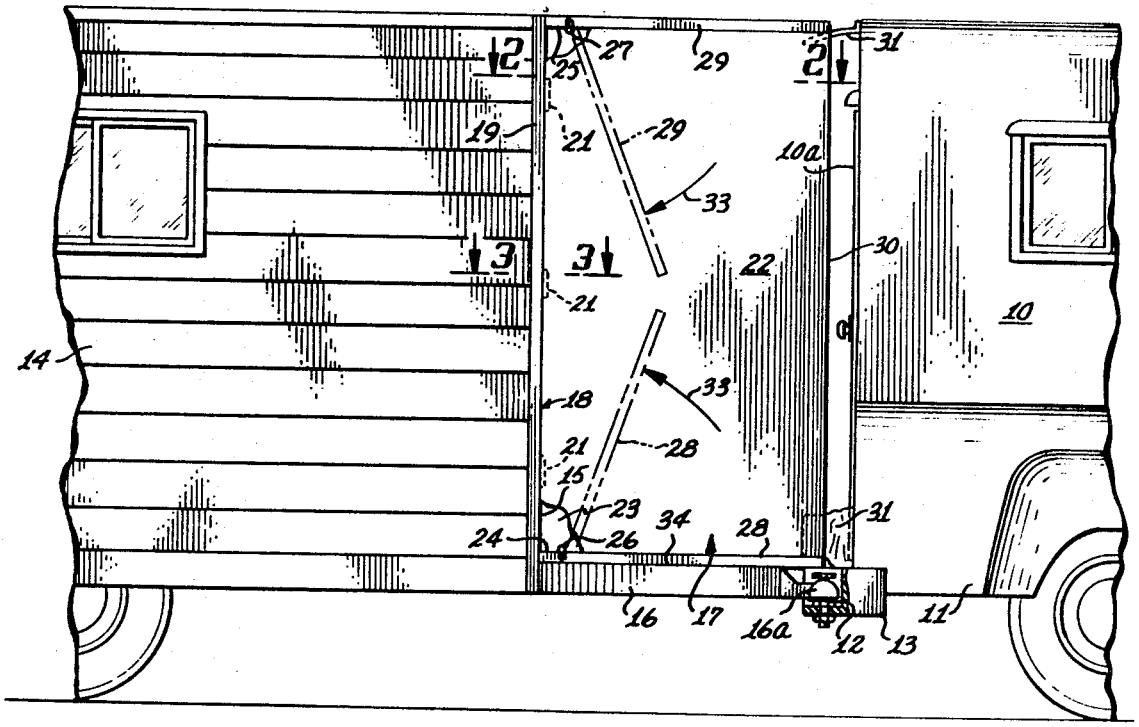
FIG. 1 is a fragmentary right side elevation of the folding connecting room for trailers incorporating the features of this invention.

As an example of one embodiment of this invention, there is shown a forward trailer unit 10, such as a truck trailer camping unit or mobile home, having a rear door 10a mounted on a pickup truck 11 having a ball hitch 12 fixed on the rear frame or bumper 13. A rear trailer unit 14 has a front door 15 and a trailer hitch yoke 16 terminating at its outer end in a demountable ball socket 16a demountably connectable to the hitch ball 12.

The folding connecting room unit indicated generally at 17, comprises a rigid folding room consisting of a frame 18 mounted on the front outer face 14a of the rear trailer unit 14. To the vertical side members 19 and 20 of the frame 18 are hinged at 21 the sides 22 and 23. To the horizontal bottom member 24 and top member 25 of the frame 18 are hinged at 26 and 27 the floor 28 and roof 29 respectively. The front opening 30 formed when the sides 22 and 23, and floor 28 and roof 29 are folded out, as shown in full line in FIGS. 1 and 2, engages a suitable seal surface 31 on the rear of the forward trailer unit.

Figure 2:
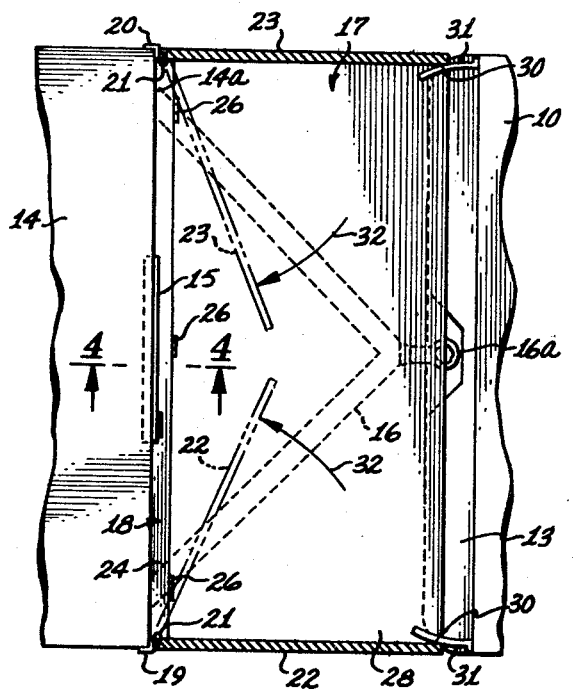
FIG. 2 is a fragmentary sectional view of the device indicated by the line 2—2 of FIG. 1.
Figure 3:
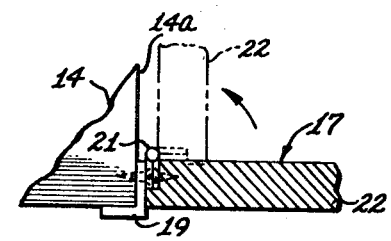
FIG. 3 is an enlarged fragmentary sectional view on the line 3—3 of FIG. 1.
Figure 4:
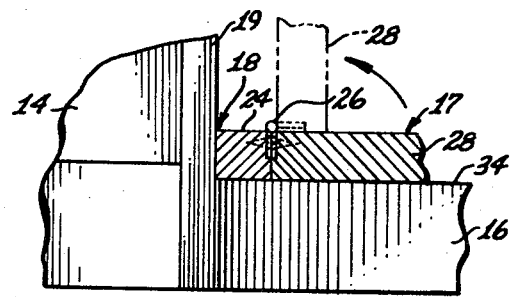
FIG. 4 is an enlarged fragmentary sectional view on the line 4—4 of FIG. 2.

To prepare the unit for travel or hitching, the sidewalls 22 and 23 are folded inwardly against the front face of the rear trailer unit 14, as indicated by arrows 32, FIG. 2, and then the floor 28 and roof 29 are folded inwardly as indicated by the arrows 33, FIG. 1. The floor 28 when unfolded rests upon the top surface 34 if the hitch yoke 16 for maximum load carrying support for the floor of the folding connecting room as a whole when opened out for occupancy. Thus interconnected access, fully weather protected between the units 10 and 14, is obtained as well as additional living space coupled with both units 10 and 14. Suitable hooks and locks may be provided to secure the sides, floor and roof members rigidly together both in opened out position and in folded up traveling position.

I claim:
1. The combination comprising:
   A. a forward trailer unit having a rear door,
   B. a rear trailer unit having a front door,
   C. a trailer hitch yoke demountably connected to the forward trailer unit, and
   D. a folding connecting room arranged between said forward trailer unit and said rear trailer unit above said trailer hitch yoke, said room comprising,
   E. a frame mounted on the front face of the rear trailer unit including,
   F. a pair of laterally spaced vertical side members,
   G. sides having their rear edges vertically hinged to said frame vertical side members,
   H. a pair of vertically spaced horizontal members for the frame,
   I. a floor horizontally hinged at its rear edge to the lower of the horizontal members of the frame,
   J. a roof horizontally hinged at its rear edge to the upper of the horizontally disposed members of the frame,
   K. the sides being foldable over the front face of the rear trailer unit and the floor swung up and the roof swung down over the outside of the folded up sides for traveling position of the trailers,
   L. said floor being load supported on the top of the trailer hitch yoke and interlocked with sides and roof of the folding connecting room.

2. The combination set forth in claim 1 wherein means are mounted on said forward trailer unit for engaging with said side members and said roof when in extended position for providing a sealing connection therebetween.